Nov. 29, 1966  G. V. JORGENSON  3,289,003
CONTAMINANT MONITORING SYSTEM INCORPORATING IONIZATION
AND DETECTION OF CONTAMINANT PARTICLES
Filed May 29, 1963
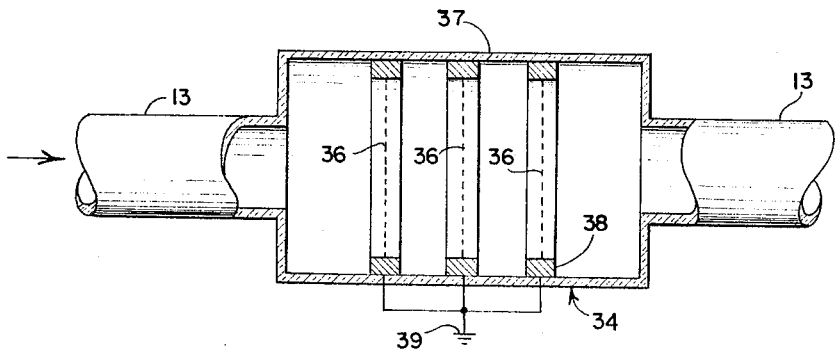
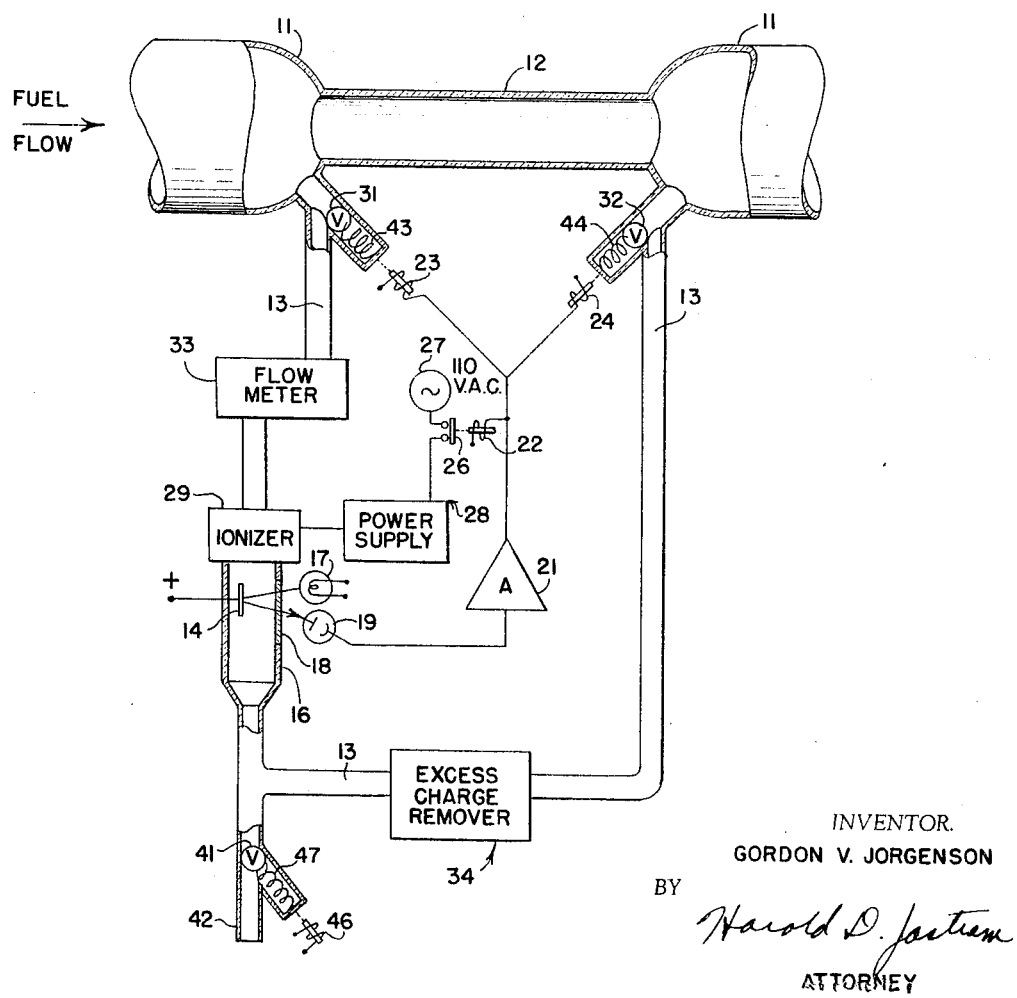
INVENTOR.
GORDON V. JORGENSON
BY
*Harold D. Jostrum*
ATTORNEY United States Patent Office 3,289,003
Patented Nov. 29, 1966

3,289,003
CONTAMINANT MONITORING SYSTEM INCORPORATING IONIZATION AND DETECTION OF CONTAMINANT PARTICLES
Gordon V. Jorgenson, Hopkins, Minn., assignor, by mesne assignments, to Litton Systems, Inc., Beverly Hills, Calif., a corporation of Maryland
Filed May 29, 1963, Ser. No. 284,217
7 Claims. (Cl. 250—218)

This invention relates to an apparatus for detecting contamination in a liquid and more particularly to an apparatus for continuously detecting or monitoring the contaminant concentration in a liquid fuel.

There are many methods now used for measuring the concentration of contaminants in a liquid such as the liquid fuel utilized in airplanes and the like. Unfortunately, many of the methods and apparatus do not produce an indication of the contaminant concentration until some or a large quantity of the fuel has already been placed in storage tanks for use or has actually been used. For example, in one such method, a small sample (one gallon) is taken at the time of filling a storage tank. This sample is sent to a laboratory where it is tested by forcing it through very fine filters. The collected contaminant is then weighed. The measured results are then returned to the storage installation. This is not only time consuming but has the added disadvantage that a small sample may not be representative of the thousands of gallons which might make up the content of the storage tank. Further, fuel which is being taken from such a storage tank, is tested for its contaminant concentration and the results of the test are often not known until long after the fuel has been utilized in an aircraft or other device. On the other hand, sampling which does permit an immediate reading of the contaminant concentration often has the disadvantage of only periodically sampling a very small portion of the overall fuel flow as the fuel is being pumped into tanks for use.

It is therefore an object of the present invention to provide a new and improved apparatus for detecting contamination in a liquid.

It is a further object of the present invention to provide a new and improved apparatus for continuously detecting the concentration of contamination in a liquid fuel.

It is a further object of the present invention to provide a new and improved apparatus for continuously sampling a small portion of the fuel flow in a line to measure the contaminant concentration of the fuel.

It is yet another object of the present invention to provide a new and improved monitoring device which continuously samples fuel flowing in a line and detects the concentration of a contaminant in the fuel and provides an indication of the contaminant concentration.

With these and other objects in view, the invention contemplates a monitoring apparatus which contains a line having a flow meter for measuring the amount of fuel which is captured from the fuel line. The captured fuel or liquid is subjected to an electrical field to charge the contaminant particles. These charged contamination particles are then detected to determine their concentration in the captured fluid. These and other objects of the invention will become more obvious when considered in connection with the specification and the figures in which:

FIGURE 1 is a schematic diagram of a system according to the present invention, and FIGURE 2 is a diagram of a charge remover utilized in FIGURE 1.

Refer first to FIGURE 1 of the drawings. Fuel which is being pumped into a storage tank or which is being pumped into a tank of an aircraft or similar machine, flows through conduit 11. The fuel flow is in the arrow direction and encounters a constricted portion of the line 12. This constricted portion 12 might be a section which is introduced into the usual supply line or it might be an integral part of the line 11 itself. At the constricted portion 12, a line 13 is connected across the constricted portion 12. This constricted portion 12 changes the pressure characteristics in the line 11 so that certain amount of the fuel which is flowing in line 11 is captured and directed into line 13. This captured fuel flow may be any percentage of the total volume of fuel flowing in the line 11 and may be regulated by regulating the amount of constriction of the constricted portion 12, the size of the line 13 and similar factors. In any event the fuel which is flowing in line 13 is a certain percentage of the total volume of fuel which is flowing in line 11. This captured or diverted fuel is the portion of the continuous flowing fuel which will be tested to determine the contaminant concentration in the total volume of fuel flowing in the line 11.

A number of methods might be utilized to detect the concentration of the contaminant in the fuel flowing in line 13. To illustrate the invention however, a mirror 14 (such as a metallic mirror) is mounted in an enlarged portion 16 of the line 13. The mirror 14 is positioned so that a light source 17 may be utilized to cast a beam of light through a window 18 in the enlarged portion 16 so that the light beam is reflected from the mirror and detected by a conventional photocell 19. When the light source 17 is operating, the photocell 19 is energized if there is no contamination in the portion 16 of the line or if there is no contamination on the surface of the mirror 14. The light beam is reflected from the mirror 14 and energizes the photocell 19. A voltage output from the photocell 19 is amplified by the amplifier 21. Amplifier 21 may be of any conventional type designed to amplify the voltage output of a conventional photodetector cell.

The output from the amplifier 21 energizes the solenoids 22, 23, and 24. Solenoids 22 and 23 are connected so that when they are energized, they overcome the springs 43 and 44 to open valves 31 and 32. The opened valves 31 and 32 permit fluid to be directed through conduit 13 to the various monitoring components.

When solenoid 22 is energized by the amplifier 21, a switch 26 is closed connecting a high voltage source 27 to a power supply 28. This power supply 28 may be of conventional design and may be a type adapted to provide electrical power to an ionizer 29.

The ionizer 29 is utilized to electrically charge the contaminating particles which are flowing in the line 13. An example of such an ionizing system is more fully explained in an article by Otmar M. Stuetzer titled Electrohydrodynamic Precicipator which was printed in The Review of Scientific Instruments, volume 33, No. 11, pages 1171–1177 which was published November, 1962. The power supply 28 provides the power to operate the ionizer which in turn charges the contaminant particles. If the particles are negatively charged, for instance, the mirror 14 might be connected to a source of positive potential. With the mirror 14 thus energized, the negative ions of the contamination which are generated by the ionizer 29 are collected by the mirror 14. Consequently, mirror 14 acts as a collector for all of the ionized contaminant particles such as solid particles in the fluid flowing in line 13. It should be pointed out at this time that it is assumed that the fluid which is flowing in line 13 is insulating fluid which is not readily ionized by the ionizer 29. These fluids most of the hydrocarbon fuels and similar liquid fuels utilized in aircraft and similar machines. When the fuel begins to flow in line 13, there is no collected contaminant on the surface of mirror 14, thus the light beam from the light source 17 is reflected to the photodetector cell 19. The output from the cell 19 is amplified by the amplifier 21 to energize the solenoids 22, 23, and 24 so that valves 31 and 32 are opened. These open valves permit a continuous flow of fuel from the line 11 through the flow meter 33, the ionizer 29, and the charge remover 34 back to the line 11.

At the same time that the ionizer is charging the contaminant particles and the mirror is providing a collection function, the flow meter 33 is recording the total volume flow in the line 13. This volume of flow is related to the contaminant concentration in the liquid which then may be computed on a basis of contaminant per unit volume of liquid. After the mirror 14 has collected a certain amount of the contaminant, the reflected light beam from the light source 17 is reduced to a predetermined extent such that the output from photodetector 19 is reduced. Termination or decrease of the voltage output below a predetermined level from the photodetector 19 reduces the signal output from amplifier 21 below a predetermined level. When this occurs, the solenoids 22, 23 and 24 are deenergized and switch 26 opens and valves 31 and 32 close respectively. When this occurs, the flow of liquid through the line 13 ceases. The operator of the device determines the extent of the contamination by simply referring to the flow meter 13 to determine the total amount of fluid which has passed through the line 11 in comparison to the predetermined amount of contaminant which must be collected to close the valves 32 and 33.

What might constitute an excessive amount of contaminant depends upon the application of the fuel. If the fuel is merely being used for burning conventional furnaces, for instance, the contaminant content might be relatively high and still the fuel may be acceptable. However, if the fuel is being utilized in a high speed aircraft, the contaminant concentration might have to be maintained at a relatively low level. These varying requirements may be adjusted by simply calibrating the flow meter 33 and photodetector cell 19 in accordance with the requirements of the particular fuel involved.

Line 13 returns the tested fluid to the line 11 after it has been checked by the apparatus. In many cases, certain of the contaminants which contain the electrical charge are released or carried past the mirror 14 to the return portion of the line 13 for return to the storage vessel or to the tank of the aircraft or like machine. Often these charged particles present a danger in the storage tank concerned. In order to avoid a build-up of the electrical charge in the storage tank, an excess charge remover is provided in the line 13. Such a charge remover is illustrated in FIGURE 2 of the drawings. It might, for example, consist simply of a series of screens 36 through which the fuel must flow on a return to the line 11. These screens 36 are constructed of electrical conductors and are mounted in a casing 37 which is sufficiently large to permit a free flow of the fuel at low fluid velocity. Each of the screens 36 is mounted in a conductive ring 38 which is grounded through the casing 37 to a ground 39. Thus, the electrically charged particles which encounter the screens 36 are collected by the screens 36 and since the screens are grounded the charge is drained off from the particles after which the particles are permitted to pass through the screens 36 to the line 11.

Very often the build up of the contaminant concentration on the surface of mirror 14 is very high and also the accumulation of the contamination on the walls of the line 13 becomes quite high. This accumulation might be high enough so that it would be undesrible to return the contamination to the fuel line 11. In order to prevent return of this collected contamination, a flush valve 41 is provided. Valve 41 is located near an outlet 42 where the system may be drained.

Valves 31 and 32 which contain springs 43 and 44 for resisting the action of the solenoids 23 and 24 are constructed so that they are manually operable. After valves 31 and 32 are automatically closed, the valves may be individually manually operated so that the fluid in the line 13 may be removed or flushed through the outlet 42. Valve 41 is operated by a solenoid 46 or it might also be manually opened against the action of spring 47. When the valve 41 is opened and the valve 32, for instance, is opened, the fluid which is in the return portion of line 13 may be removed from the line through the flushing outlet 42, thus removing any contaminant that is in that portion of the line 13. Next the valve 32 may be closed and valve 31 may be manually opened so that any material containing a high concentration of contaminant which is in the inlet portion of the line 13 may be flushed from the system through the outlet 42. The line 13 may be maintained relatively contaminant free for various applications and any contaminant removed from the fuel will not be returned to the storage tank.

Many variations of the above described embodiment are possible and it is to be understood that the above is merely illustrative of the application of the principles of the invention. Many modifications and variations may be made by those skilled in the art which fall within the spirit and scope of the invention.

Now, therefore I claim:

1. An apparatus for continuously monitoring the contaminant concentration in a flowing liquid which comprises a line for continuously capturing a portion of the flowing liquid and for returning the captured liquid to the flow, means associated with said line for measuring the flow of the captured liquid, means mounted in said line for placing a charge on liquid contaminating particles, means mounted in said line for collecting said charged particles, means associated with said line and said collecting means for detecting the collected particles, and means responsive to said detecting means for terminating the flow of captured liquid when a predetermined amount of particles is collected.

2. An apparatus in accordance with claim 1 which further includes a means mounted in said line for removing the charge from particles which pass said collecting means.

3. An apparatus in accordance with claim 2 in which said collecting means includes a positively charged plate and in which said means for placing a charge on said particle charges said particles with a negative charge.

4. An apparatus for continuously monitoring a contaminant concentration in a flowing liquid which comprises a line for continuously capturing a portion of the flowing liquid and for returning the captured liquid to the flow, a flow meter for measuring the flow of the captured liquid, ionizing means for placing electrical charge on the liquid contaminating particles, an electrically charged means mounted in said line for collecting said charged particles, means associated with said line and said charged means for detecting the collected particles, and means responsive to said detecting means for terminating the flow of captured liquid when a predetermined amount of particles is collected.

5. An apparatus in accordance with claim 4 in which said electrically charged means includes a mirror and in which said means for detecting includes a light source and a light sensitive cell for detecting the reduced reflection of light from said mirror as said particles are collected on said mirror.

6. An apparatus in accordance with claim 4 in which said means for terminating include a first valve at the input to said line and a second valve at the output of said line and which further includes a third valve in said line which cooperates with said first and second valves to permit said line to be purged of said liquid and contaminating particles.

7. An apparatus in accordance with claim 6 in which said means for terminating further includes a power supply, a high voltage source and a switch responsive to said means for detecting for deenergizing said ionizing means in response to the collection of a predetermined amount of particles.

No references cited.

RALPH G. NILSON, *Primary Examiner.*

MARTIN ABRAMSON, *Assistant Examiner.*